United States Patent
Takao

(10) Patent No.: US 12,532,071 B2
(45) Date of Patent: Jan. 20, 2026

(54) FOCUSING APPARATUS FOR CONTINUOUSLY KEEPING IN FOCUS, IMAGE PICKUP APPARATUS FOR CONTINUOUSLY KEEPING IN FOCUS, FOCUSING METHOD FOR CONTINUOUSLY KEEPING IN FOCUS, AND STORAGE MEDIUM

(71) Applicant: CANON KABUSHIKI KAISHA, Tokyo (JP)

(72) Inventor: Maiko Takao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 201 days.

(21) Appl. No.: 18/455,764

(22) Filed: Aug. 25, 2023

(65) Prior Publication Data

US 2024/0080554 A1    Mar. 7, 2024

(30) Foreign Application Priority Data

Aug. 31, 2022 (JP) .................................. 2022-137432

(51) Int. Cl.
*H04N 23/67* (2023.01)

(52) U.S. Cl.
CPC .................................. *H04N 23/67* (2023.01)

(58) Field of Classification Search
CPC .... H04N 23/67; H04N 23/611; H04N 23/663; H04N 23/675; H04N 23/672
See application file for complete search history.

(56) References Cited

U.S. PATENT DOCUMENTS

| | | | |
|---|---|---|---|
| 2014/0300792 A1* | 10/2014 | Nakamura | H04N 23/672 348/333.08 |
| 2018/0084192 A1* | 3/2018 | Suzuki | H04N 23/681 |
| 2019/0020826 A1* | 1/2019 | Takehara | H04N 25/674 |
| 2021/0127066 A1* | 4/2021 | Kudo | H04N 23/675 |

FOREIGN PATENT DOCUMENTS

JP    2018-004918 A    1/2018

* cited by examiner

*Primary Examiner* — Gevell V Selby
(74) *Attorney, Agent, or Firm* — Cowan, Liebowitz & Latman, P.C.

(57) ABSTRACT

A control apparatus includes a memory storing instructions, and a processor configured to execute the instructions to acquire, based on image data output from an image sensor, a first image plane position of an object and detection reliability, predict a second image plane position of the object based on a history of a defocus amount acquired by a focus detecting unit, and set a driving amount of a focus lens for focusing on the object based on the first image plane position in a case where the processor determines that a difference between the first image plane position and the second image plane position is larger than a first threshold.

34 Claims, 14 Drawing Sheets

FOCUSING APPARATUS FOR CONTINUOUSLY KEEPING IN FOCUS, IMAGE PICKUP APPARATUS FOR CONTINUOUSLY KEEPING IN FOCUS, FOCUSING METHOD FOR CONTINUOUSLY KEEPING IN FOCUS, AND STORAGE MEDIUM

BACKGROUND

Technical Field

One of the aspects of the embodiments relates to a focusing apparatus, an image pickup apparatus, a focusing method, and a storage medium.

Description of Related Art

There is conventionally known an image pickup apparatus that can track an object through an autofocus (AF) function that automatically adjusts a focus position of an optical system. There is also conventionally known an image pickup apparatus that can predict a future movement of an object from the past movement history of the object. Japanese Patent Laid-Open No. 2018-4918 discloses a method of changing a driving target of a focus lens based on the reliability of a focus detection result obtained by tracking an object.

The method disclosed in Japanese Patent Laid-Open No. 2018-4918 drives the focus lens based on the prediction result instead of the tracking result (focus detection result) in a case where a difference between the focus detection result and the prediction result of the object exceeds a threshold. As a result, the object may not be continuously kept in focus, and stable tracking of the object becomes difficult.

SUMMARY

A control apparatus according to one aspect of the embodiment includes a memory storing instructions, and a processor configured to execute the instructions to acquire, based on image data output from an image sensor, a first image plane position of an object and detection reliability, predict a second image plane position of the object based on a history of a defocus amount acquired by a focus detecting unit, and set a driving amount of a focus lens for focusing on the object based on the first image plane position in a case where the processor determines that a difference between the first image plane position and the second image plane position is larger than a first threshold. An image pickup apparatus having the above control apparatus, a control method corresponding to the above control apparatus, and a storage medium storing a program that causes a computer to execute the above control method also constitute another aspect of the disclosure.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a description will be given of embodiments according to the disclosure.

Imaging System Configuration

Figure 1:
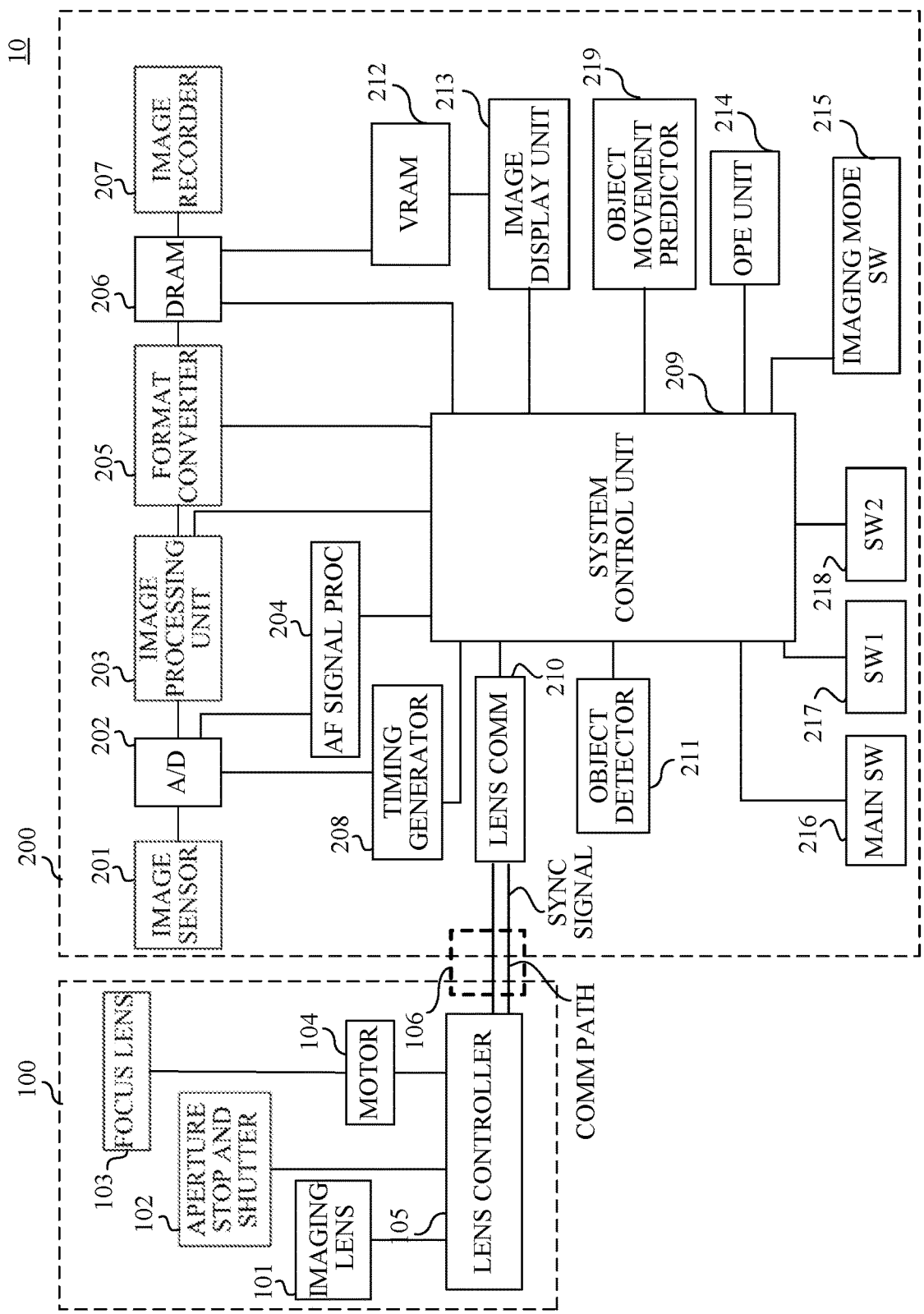
FIG. 1 is a block diagram of an imaging system according to this embodiment.

Referring now to FIG. 1, a description will be given of a configuration of an imaging system according to this embodiment. FIG. 1 is a block diagram of an imaging system 10. The imaging system 10 is an interchangeable lens camera system that includes a camera body (image pickup apparatus) 200 and a lens apparatus (interchangeable lens)

100 attachable to and detachable from the camera body 200. However, this embodiment is not limited to this example, and can also be applied to an image pickup apparatus in which a camera body and a lens apparatus are integrated.

The imaging system 10 includes a focusing apparatus and performs focusing using an imaging-plane phase-difference detecting method that uses an output signal from an image sensor 201 that captures an object image. In a case where the lens apparatus 100 is attached to the camera body 200 via a mount unit having an electric contact unit 106, the lens controller 105 and a system control unit 209 can communicate with each other.

The lens apparatus 100 has an imaging lens 101 that includes a zoom mechanism, an aperture stop and shutter 102 for controlling a light amount, a focus lens 103 for focusing on the image sensor 201, and a motor (driving unit) 104 for driving the focus lens 103. The lens apparatus 100 also has a lens controller 105 that controls the operation of the lens apparatus 100.

The camera body 200 is configured so as to acquire an imaging signal from a light beam that has passed through an optical system (imaging optical system) in the lens apparatus 100. The camera body 200 includes the image sensor 201 that photoelectrically converts reflected light from an object into an electric signal, an analog-to-digital (A/D) converter 202 that includes a correlated double sampling (CDS) circuit that removes output noise from the image sensor 201 and a nonlinear amplifier circuit that performs A/D conversion, an image processing unit 203, and an AF signal processing unit 204. The camera body 200 also includes a format converter 205, a high-speed built-in memory (such as random-access memory, referred to as DRAM hereinafter) 206, and an image recorder 207 that includes a recording medium such as a memory card and its interface. The camera body 200 also includes a timing generator 208, the system control unit 209 that controls a system such as an imaging sequence, and a lens communication unit 210 that communicates between the camera body 200 and the lens apparatus 100. The system control unit 209 performs focus control based on focus information (focus detection information) of an object area, and centrally controls the entire operation of the imaging system 10.

The camera body 200 includes an object detector 211, an image display memory (VRAM) 212, and the object movement predictor (prediction unit) 219. An object detector 211 detects an object area based on image data output from the image sensor 201. The object movement predictor 219 performs prediction processing using the history of the focus detection result (defocus amount) based on the image data output from the image sensor 201, and predicts (acquires) a predicted image plane position (second image plane position) of the object.

In addition to image display, the camera body 200 includes an image display unit 213 that displays an imaging screen and a focus detection area during imaging, as well as display for operation assistance and camera status. The camera body 200 includes an operation unit 214 for operating the camera body 200 from the outside, an imaging mode switch 215 for selecting an imaging mode such as a macro mode and a sports mode, and a main switch 216 for powering on the system. The camera body 200 includes a switch (SW1) 217 for performing an imaging standby operation such as autofocus (AF) and auto-exposure (AE), and an imaging switch (SW2) 218 for imaging after SW1 is operated. The DRAM of the built-in memory 206 is used as a high-speed buffer as a temporary image memory, or as a working memory for image compression/decompression.

The operation unit 214 includes, for example, a menu switch for performing various settings such as the imaging function of the camera body 200 and settings during image playback, an operation mode switch between an imaging mode and a playback mode, and the like.

The image sensor 201 is a photoelectric conversion element such as a CCD sensor or CMOS sensor. Each pixel of the image sensor 201 in this embodiment includes two (a pair of) photodiodes A and B and one microlens provided for the pair of photodiodes A and B. Each pixel splits incident light with the microlens, form a pair of optical images on a pair of photodiodes A and B, and outputs pixel signals (A signal and B signal) for an AF signal, which will be described below, from the pair of photodiodes A and B. Adding the outputs of the pair of photodiodes A and B can provide an imaging signal (A+B signal).

An AF signal (focus detection signal) for AF (imaging-plane phase-difference AF) by the imaging-plane phase-difference detecting method by combining a plurality of A signals and a plurality of B signals output from a plurality of pixels. The AF signal processing unit 204 is a focus detector configured to perform correlation calculation for a pair of image signals, to calculate a phase difference (image shift amount) that is a shift amount between the pair of image signals, and to calculate a defocus amount (and defocus direction and reliability) of the imaging optical system from the image shift amount. The AF signal processing unit 204 performs a plurality of calculations in a predetermined area where a defocus amount can be specified.

Operation of Imaging System

Figure 2:
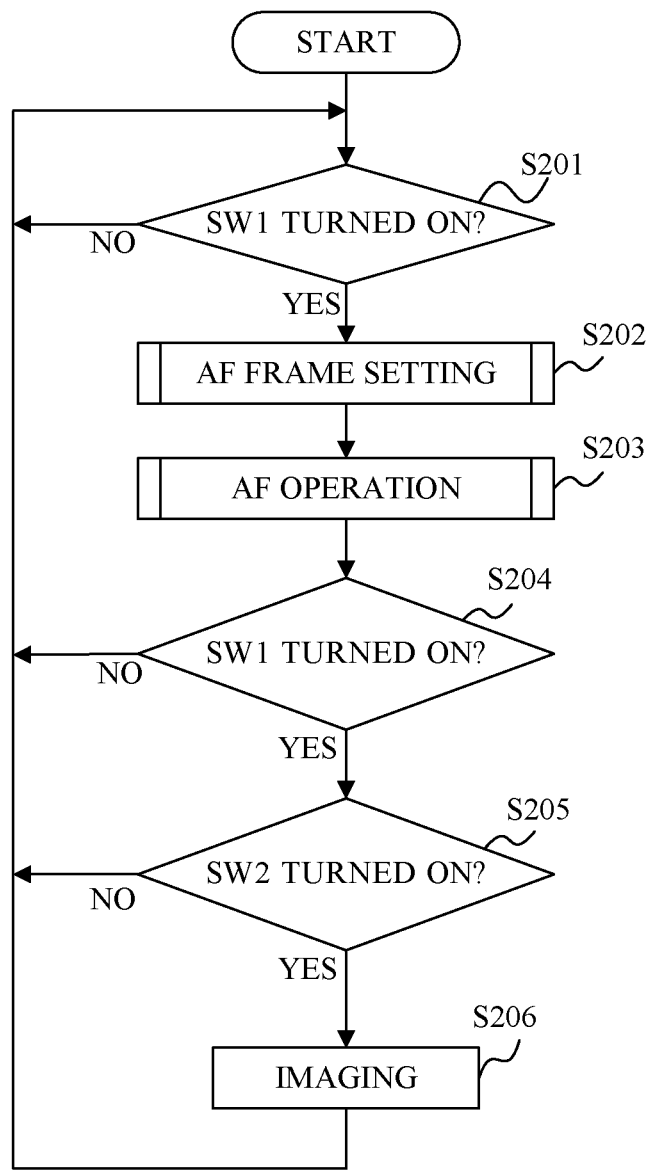
FIG. 2 is a flowchart of an operation of the imaging system according to this embodiment.

Referring now to FIG. 2, a description will be given of the operation of the imaging system 10 according to this embodiment. FIG. 2 is a flowchart of the operation of the imaging system 10, illustrating the flow of imaging control processing in a case where still image capturing is performed from a state in which a live-view image is displayed. The system control unit 209 as a computer executes this processing according to a control program as a computer program.

First, in step S201, the system control unit 209 determines whether SW1 (217) is turned on. In a case where SW1 (217) is turned off, the determination of step S201 is repeated. On the other hand, in a case where SW1 (217) is turned on, the flow proceeds to step S202. In step S202, the system control unit 209 sets an AF frame (focus detection area), which will be described below, for the AF signal processing unit 204. Next, in step S203, the system control unit 209 performs an AF operation, which will be described below. Next, in step S204, the system control unit 209 determines whether SW1 (217) is turned on. In a case where SW1 (217) is turned on, the flow proceeds to step S205. On the other hand, in a case where SW1 (217) is turned off, the flow returns to step S201. In step S205, the system control unit 209 determines whether SW2 (218) is turned on. In a case where SW2 (218) is turned on, the flow proceeds to step S206. On the other hand, in a case where SW2 (218) is turned off, the flow returns to step S201. In step S206, the system control unit 209 performs an imaging operation, and the flow returns to step S201.

AF Frame Setting

Figure 3:
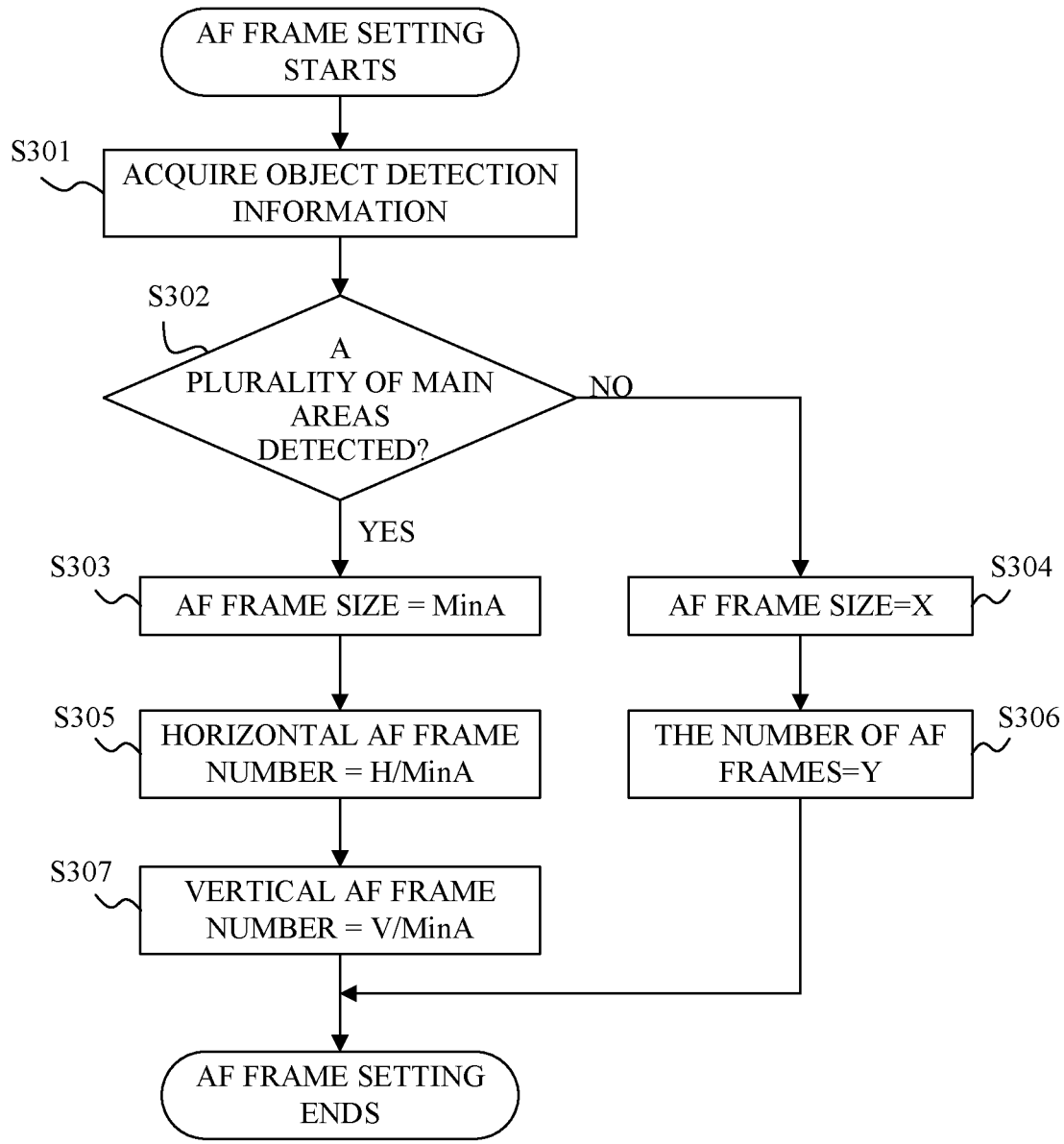
FIG. 3 is a flowchart of setting an AF frame according to this embodiment.

Referring now to FIG. 3, a description will be given of AF frame setting (step S202 in FIG. 2). FIG. 3 is a flowchart illustrating the AF frame setting. First, in step S301, the system control unit 209 acquires object detection information from the object detector 211. The object in this embodiment is a person, and a main area (object area) within the object is to be detected. Here, the main area is eyes, a face, and a body of a person or animal. They can be detected by using a learning method based on known machine learning, recognition processing by image processing means, or the like.

For example, the types of machine learning include (1) Support Vector Machine, (2) Convolutional Neural Network, and (3) Recurrent Neural Network.

An example of the recognition processing includes a method in which a skin color area is extracted from gradation colors of each pixel represented by image data, and a face is detected based on a matching degree with a previously prepared face contour plate. Another known method is to detect a face by extracting facial feature points such as the eyes, nose, and mouth using a known pattern recognition technique. The method of detecting the main area applicable to this embodiment is not limited to these methods, and another method may be used.

Next, in step S302, the system control unit 209 determines whether or not a plurality of main areas are detected in the detection result of the object detector 211. In a case where a plurality of main areas have been detected, the flow proceeds to step S303. On the other hand, in a case where the plurality of main areas have not yet been detected (in a case where only a single main area is detected), the flow proceeds to step S304.

Figure 4A:
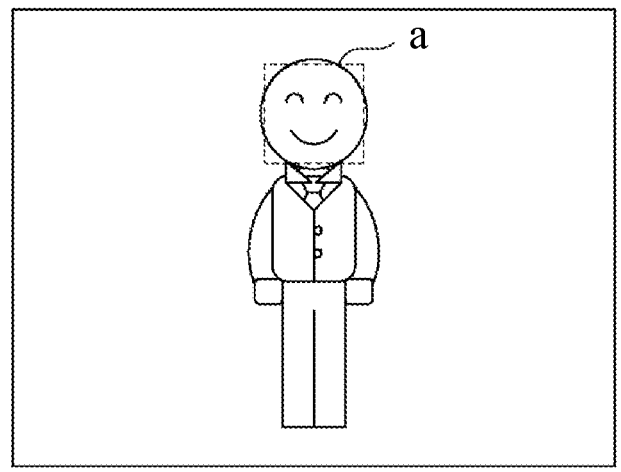
FIGS. 4A and 4B explain a single main area detected in this embodiment.
Figure 4B:
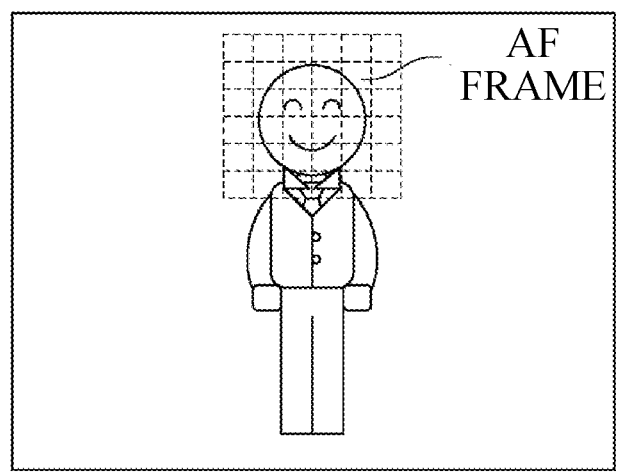
Figure 5A:
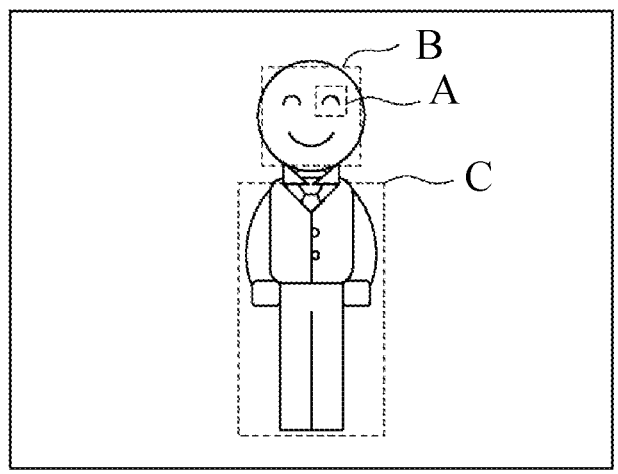
FIGS. 5A and 5B explain a plurality of main areas detected in this embodiment.
Figure 5B:
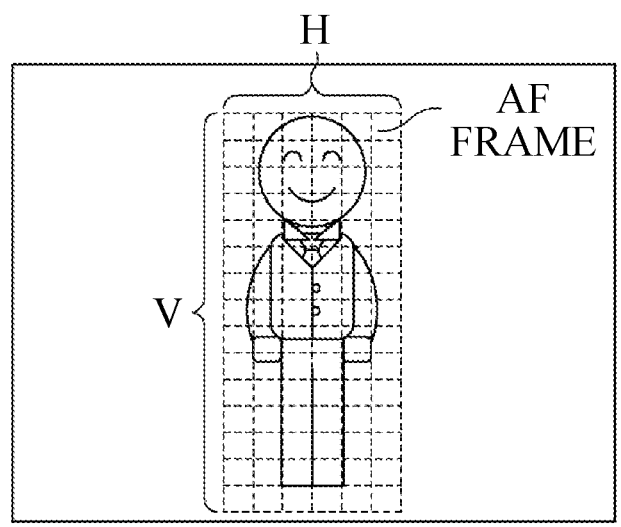

Referring now to FIGS. 4A, 4B, 5A, and 5B, detection of a single main area and detection of a plurality of main areas will be described. FIGS. 4A and 4B explain a detected state of a single main area. FIGS. 5A and 5B explain a detected state of a plurality of main areas.

FIG. 4A illustrates a detected state of face a (state in which only a single main area is detected). FIG. 5A illustrates a detected state of a pupil A, a face B, and a body C (a state in which a plurality of main areas are detected). This embodiment assumes that the object detector 211 can acquire a type of object such as a person or an animal, center coordinates, a horizontal size, and a vertical size of each detected main area.

In step S303, the system control unit 209 inputs a minimum detectable main area, that is, a smaller value of the horizontal size or the vertical size of the pupil A in FIG. 5A to MinA, and uses MinA as one AF frame size. Next, in step S305, the system control unit 209 obtains the horizontal size H in FIG. 5B that includes all the main areas from the horizontal coordinates and horizontal size of each detected main area. The system control unit 209 determines the number of horizontal AF frames (H/MinA) by dividing the horizontal size H by the AF frame size MinA.

Next, in step S307, the system control unit 209 obtains the vertical size V in FIG. 5B that includes all the main areas from the vertical coordinates and vertical size of each detected main area. The system control unit 209 determine the number of vertical AF frames (V/MinA) by dividing the vertical size V by the AF frame size MinA, and ends the AF frame setting. This embodiment sets the AF frame to a square area using the minimum size, but this embodiment is not limited to this example. The AF frame sizes may be made different between the horizontal direction and the vertical direction, and the system control unit 209 may set the calculatable number of AF frames.

In step S304, the system control unit 209 sets an AF frame of AF frame size X, which is a predetermined size, for the detected face, as illustrated in FIG. 4B. For the AF frame size X, the pupil size estimated from the face may be set, or the frame size may be set such that the S/N can be secured and sufficient focusing performance can be obtained in consideration of the low illumination environment. This embodiment sets the AF frame size X based on the estimated pupil size. Next, in step S306, the system control unit 209 sets the number of AF frames Y so that the area of the face a is included in the AF frame size X and the fact that a can be secured in the AF frame even if the face moves, as illustrated in FIG. 4B.

AF Operation

Figure 6:
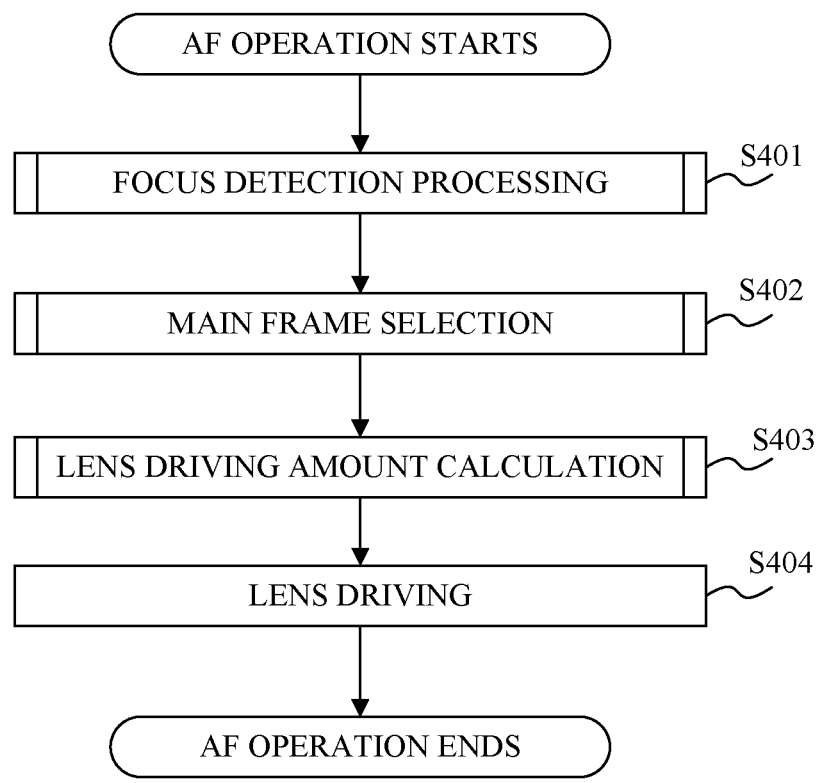
FIG. 6 is a flowchart of an AF operation according to this embodiment.

Referring now to FIG. 6, a description will be given of step S203 (AF operation) in FIG. 2. FIG. 6 is a flowchart of the AF operation.

First, in step S401, the system control unit 209 performs focus detection processing to detect the defocus amount and reliability. The focus detection processing will be described below. Next, in step S402, the system control unit 209 selects a main frame using the reliability obtained in step S401 and the object detection information obtained in step S301, which will be described below. Next, in step S403, the system control unit 209 calculates a driving amount of the focus lens 103 (lens driving amount calculation) using the main frame selection result obtained in step S402, which will be described below. Next, in step S404, the system control unit 209 transmits the driving amount of the focus lens 103 obtained in step S403 to the lens communication unit 210 to drive the focus lens 103.

Focus Detection Processing

Figure 7:
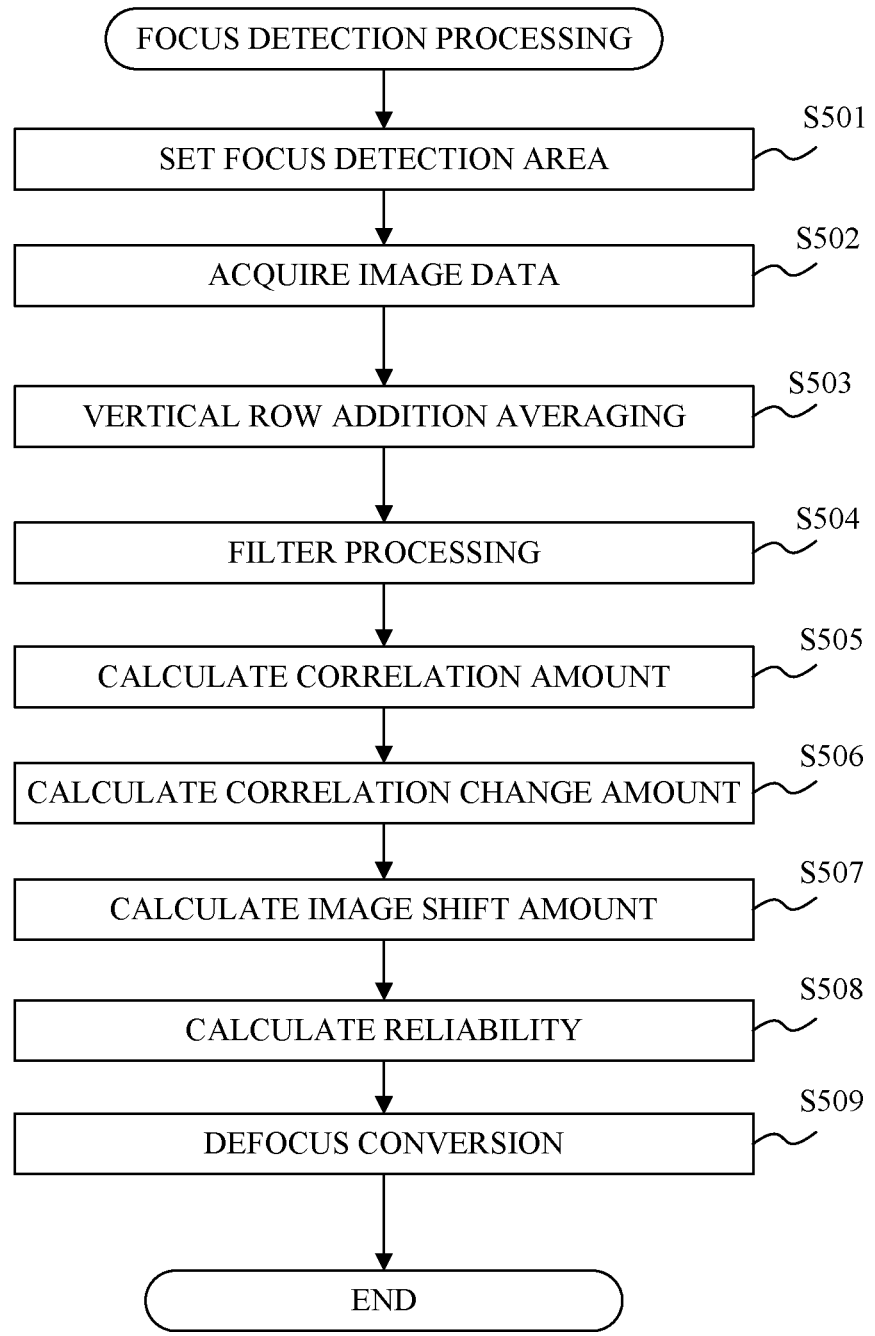
FIG. 7 is a flowchart of focus detection processing according to this embodiment.

Referring now to FIG. 7, a description will be given of step S401 (focus detection processing) in FIG. 6. FIG. 7 is a flowchart of the focus detection processing.

First, in step S501, the system control unit 209 sets an arbitrary focus detection area within the image data output from the image sensor 201. Next, in step S502, the system control unit 209 acquires a pair of image signals (An image signal, B image signal) for focus detection from the image sensor 201 corresponding to the focus detection area set in step S501. Next, in step S503, the system control unit 209 performs row addition averaging processing in the vertical direction for the pair of image signals acquired in step S502. This processing can reduce the influence of noise on the image signal. Next, in step S504, the system control unit 209 performs filter processing for extracting a signal component in a predetermined frequency band from the signal that has undergone the vertical row averaging addition processing in step S503.

Next, in step S505, the system control unit 209 calculates a correlation amount from the signal filtered in step S504. Next, in step S506, the system control unit 209 calculates a correlation change amount from the correlation amount calculated in step S505. Next, in step S507, the system control unit 209 calculates an image shift amount from the correlation change amount calculated in step S506. Next, in step S508, the system control unit 209 calculates reliability indicating how reliable the image shift amount calculated in step S507 is. Next, in step S509, the system control unit 209 converts the image shift amount into a defocus amount, and ends focus detection processing.

Main Frame Selection

Figure 8:
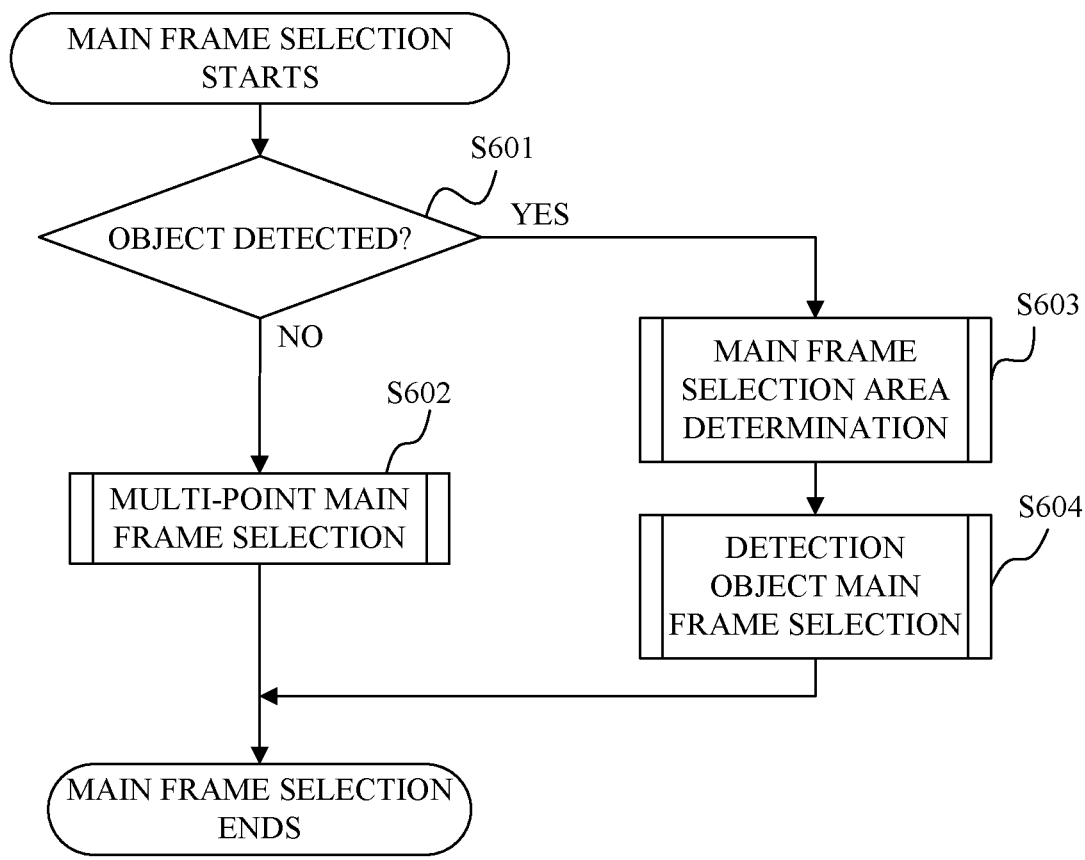
FIG. 8 is a flowchart of selecting a main frame according to this embodiment.

Referring now to FIG. 8, a description will be given of step S402 (main frame selection) in FIG. 6. FIG. 8 is a flowchart of the main frame selection. First, in step S601, the system control unit 209 determines whether or not the object detector 211 has detected an object. In a case where it is determined that the object has been detected, the flow proceeds to step S603. On the other hand, in a case where it is determined that the object has not been detected, the flow proceeds to step S602.

In step S602, the system control unit 209 performs multi-point main frame selection without using object detection information, and ends the main frame selection processing. The multi-point main frame selection method is, for example, a method of selecting a main frame in a predetermined area within a screen (image), but a detailed description thereof will be omitted. In step S603, the system control unit 209 determines a main frame selection area that is a target area for the main frame selection among a plurality of focus-detected AF frames. The details of determining the main frame selection area will be described below. Next, in step S604, the system control unit 209 selects a detection object main frame, which will be described below, for the main frame selection area obtained in step S603, and ends the main frame selection.

Determination of Main Frame Selection Area

Figure 9:
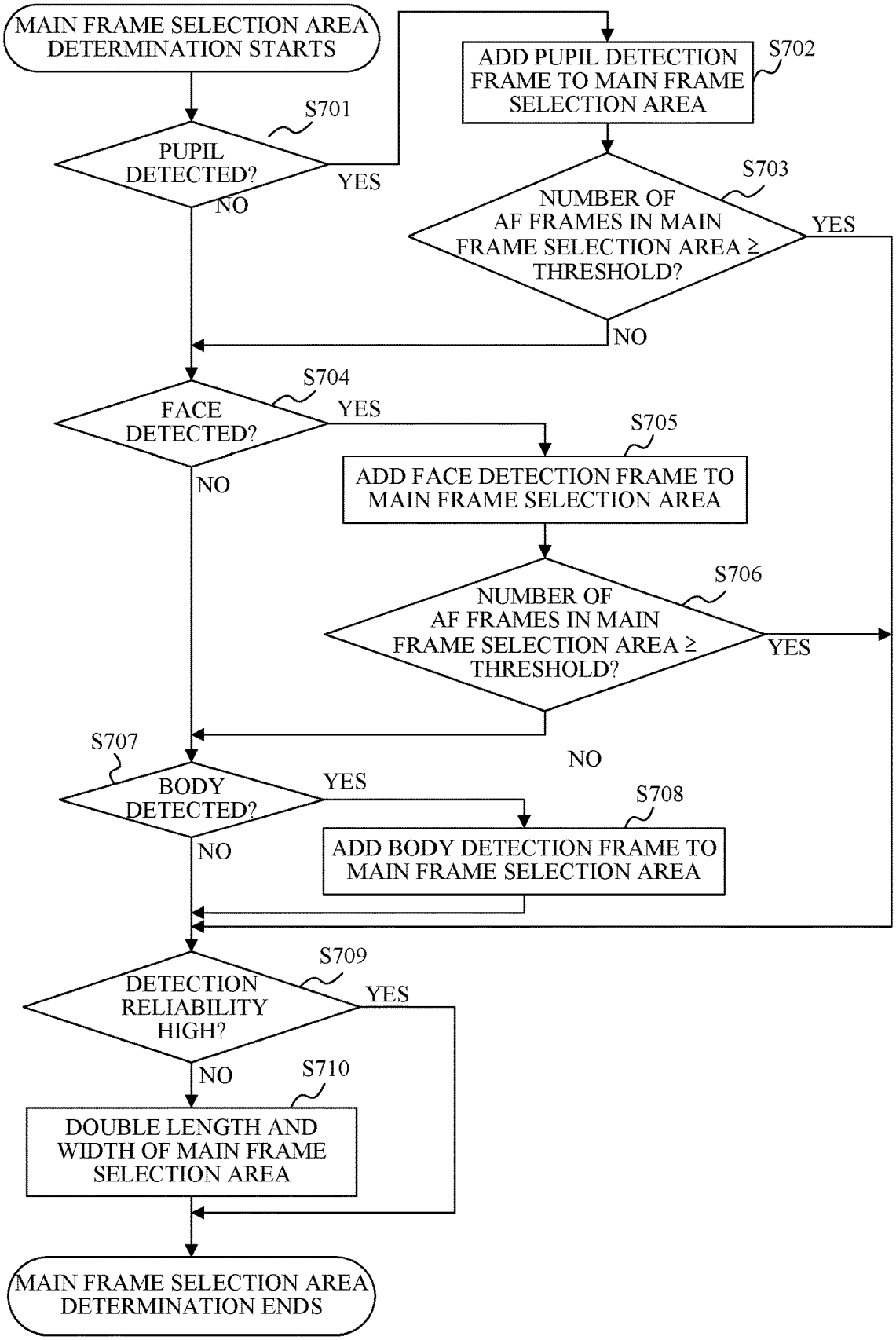
FIG. 9 is a flowchart of determining a main frame selection area according to this embodiment.

Referring now to FIG. 9, a description will be given of step S603 (main frame selection area determination) in FIG. 8. FIG. 9 is a flowchart for determining the main frame selection area.

First, in step S701, the system control unit 209 determines whether the pupil of the object has been detected, by using the object detector 211. In a case where it is determined that the pupil has been detected, the flow proceeds to step S702. On the other hand, in a case where it is determined that the pupil has not been detected, the flow proceeds to step S704. In step S702, the system control unit 209 adds a pupil detection frame as a main frame selection area. Next, in step S703, the system control unit 209 determines whether or not the number of AF frames equal to or larger than a predetermined threshold is included in the main frame selection area. In a case where it is determined that the number of AF frames is equal to or larger than the predetermined threshold, the flow proceeds to step S709. In a case where the number of AF frames is less than the predetermined threshold, the flow proceeds to step S704.

In step S704, the system control unit 209 determines whether or not the face of the object has been detected using the object detector 211. In a case where it is determined that a face has been detected, the flow proceeds to step S705. On the other hand, in a case where it is determined that no face has been detected, the flow proceeds to step S707. In step S705, the system control unit 209 adds a face detection frame as a main frame selection area. Next, in step S706, the system control unit 209 determines whether the number of AF frames equal to or larger than a predetermined threshold is included in the main frame selection area. In a case where it is determined that the number of AF frames is equal to or greater than the predetermined threshold, the flow proceeds to step S709. In a case where the number of AF frames is less than the predetermined threshold, the flow proceeds to step S707.

In step S707, the system control unit 209 determines whether the body of the object has been detected, by using the object detector 211. In a case where it is determined that the body has been detected, the flow proceeds to step S708. On the other hand, in a case where it is determined that the body has not been detected, the flow proceeds to step S709. In step S708, the system control unit 209 adds the body detection frame as the main frame selection area.

Next, in step S709, the system control unit 209 determines whether or not the reliability (detection reliability) of the object detected by the object detector 211 is equal to or higher than a threshold. In a case where it is determined that the object detection reliability is equal to or higher than the threshold, the main frame selection area determination process is terminated. On the other hand, in a case where it is determined that the reliability is lower than the threshold, the flow proceeds to step S710. In step S710, the system control unit 209 doubles the width and height of the main frame selection area, and terminates the main frame selection area determination processing.

Detection Object Main Frame Selection

Figure 10:
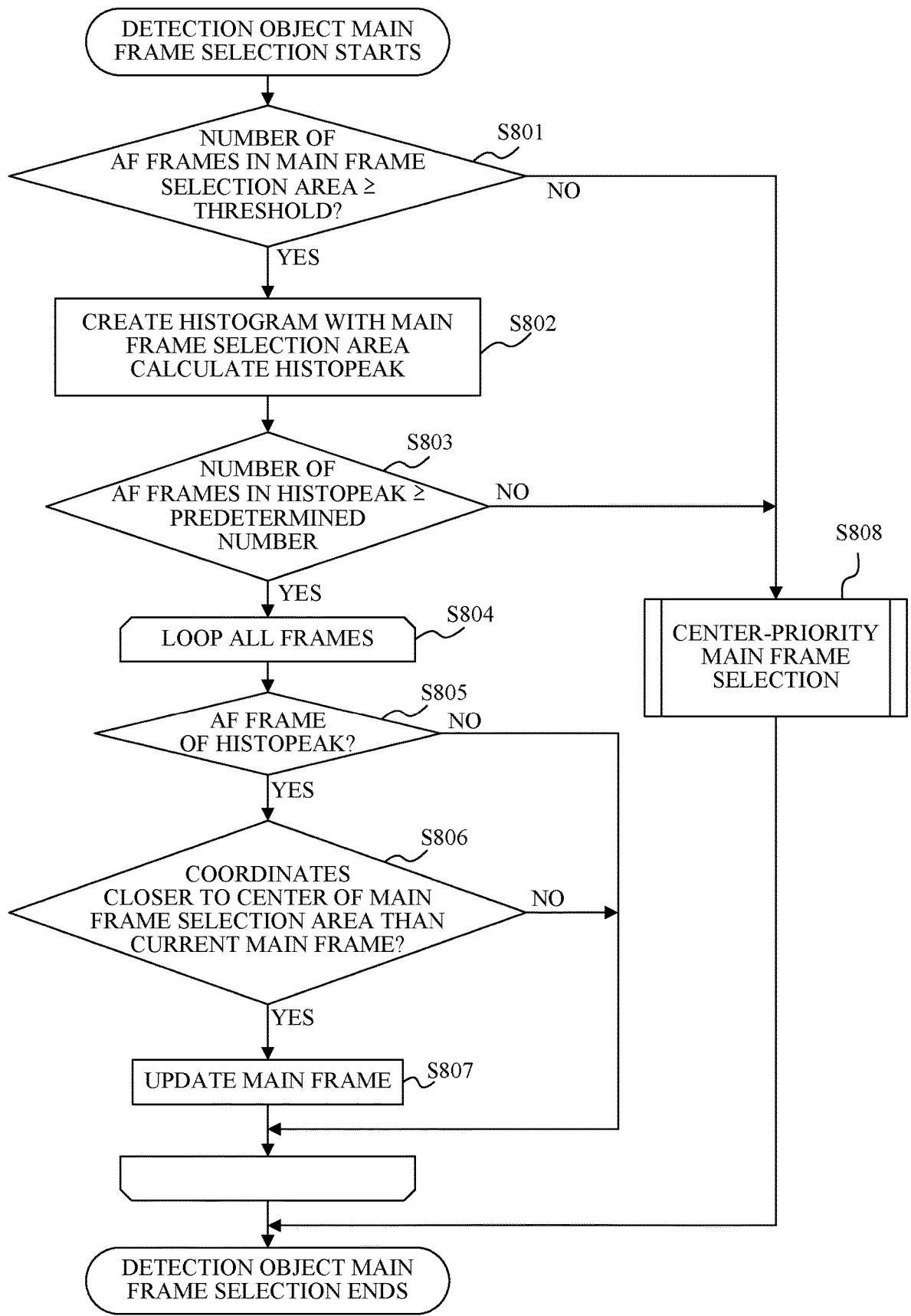
FIG. 10 is a flowchart of a detection object main frame in this embodiment.

Referring now to FIG. 10, a description will be given of step S604 (detection object main frame selection) in FIG. 8. FIG. 10 is a flowchart of the detection object main frame selection. This embodiment will discuss image analysis using a histogram, but since the image analysis using the histogram is a common technique, a detailed description thereof will be omitted.

First, in step S801, the system control unit 209 determines whether or not the number of AF frames included in the main frame selection area determined in step S603 is equal to or larger than a predetermined threshold. In a case where it is determined that the number of AF frames is equal to or larger than the predetermined threshold, the flow proceeds to step S802. On the other hand, in a case where the number of AF frames is less than the predetermined threshold, the flow proceeds to step S808. In step S808, the system control unit 209 selects a main frame by giving priority to the center (performs center-priority main frame selection), and terminates the detection object main frame selection processing.

In step S802, the system control unit 209 counts a defocus amount calculated for each AF frame set within the main frame selection area for each predetermined depth, and creates a histogram. The system control unit 209 then calculates the peak value (histopeak) of the histogram. Next, in step S803, the system control unit 209 determines whether or not the number of AF frames of the peak value (histopeak) of the histogram created in step S802 is equal to or larger than a predetermined number. In this embodiment, the peak value of the histogram is normalized with respect to the total number of AF frames, converted into a ratio, and used. In a case where the number of histopeak AF frames is equal to or larger than the predetermined number, the flow proceeds to step S804. On the other hand, in a case where the number of histopeak AF frames is less than the predetermined number, the flow proceeds to step S808. In step S808, the system control unit 209 performs the center-priority main frame selection, and terminates the detection object main frame selection processing.

In step S804, the system control unit 209 performs loop processing for all frames in order to select a main frame from the main frame selection area. In step S805, the system control unit 209 determines whether the main frame is an AF frame counted as the histopeak (AF frame of the histopeak). In a case where it is determined that the main frame is the histopeak AF frame, the flow proceeds to step S806. On the other hand, in a case where it is determined that the main frame is not the histopeak AF frame, the loop processing of step S804 is repeated. In a case where the system control unit 209 determines in step S806 that the coordinates are closer to the center of the main frame selection area than the currently selected main frame, the flow proceeds to step S807. On the other hand, in a case where it is determined that the coordinates are farther from the center of the main frame selection area than the currently selected main frame, the loop processing of step S804 is repeated. In step S807, the system control unit 209 updates the main frame. In a case where the loop of step S804 ends, the detection object main frame selection processing is terminated.

This embodiment may change the processing of selecting the detection object main frame according to the type of detected object. For example, in a case where the object is a human, an area to be focused on can be selected by prioritizing information on the number of areas to be focused on as described above.

Central Priority Main Frame Selection

Figure 11:
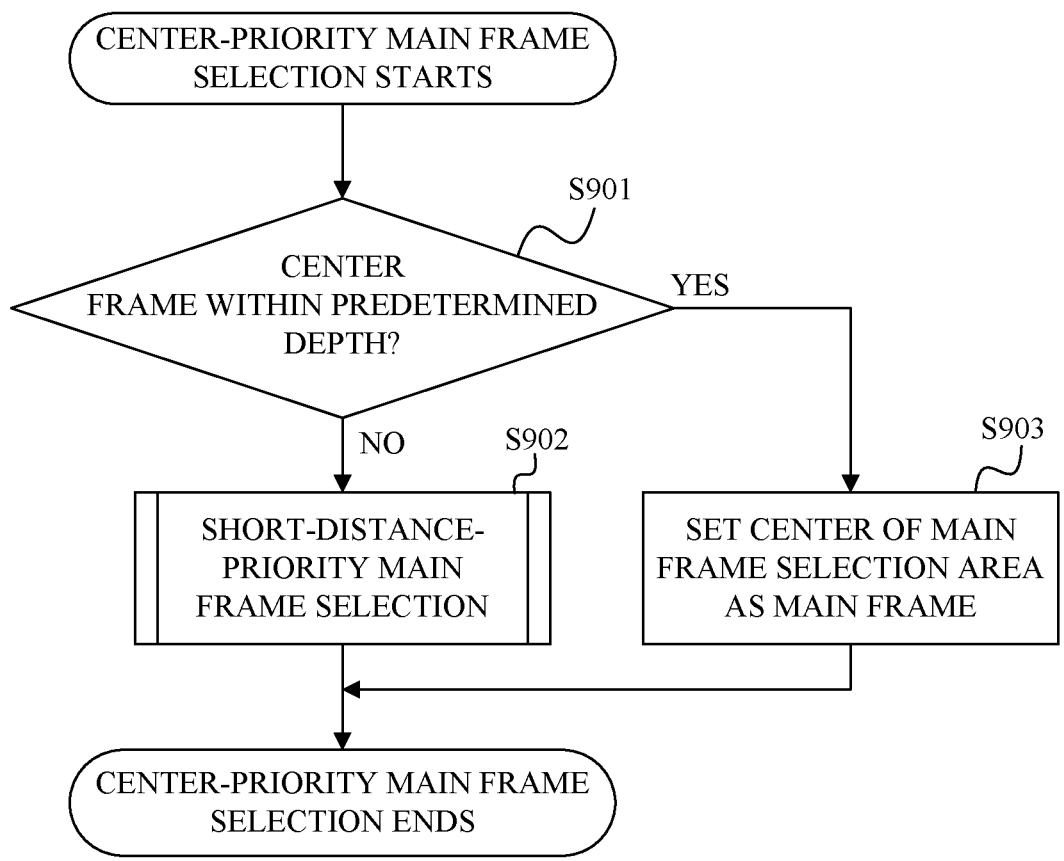
FIG. 11 is a flowchart of selecting a main frame by giving priority to the center (center-priority main-frame selection) according to this embodiment.

Referring now to FIG. 11, a description will now be given of step S808 (center-priority main frame selection) in FIG. 10. FIG. 11 is a flowchart of the center-priority main frame selection.

First, in step S901, the system control unit 209 determines whether the center (central frame) of the main frame selection area is within a predetermined depth. In a case where it is determined that the center frame is within the predetermined depth, the flow proceeds to step S903. On the other hand, in a case where it is determined that the center frame is not within the predetermined depth, the flow proceeds to step S902. In step S902, the system control unit 209 selects a main frame by giving priority to a short distance (performs short-distance-priority main frame selection), which will be described below, and ends the center-priority main frame selection process. In step S903, the system control unit 209 sets the center of the main frame selection area (center frame) as the main frame, and ends the center-priority main frame selection processing.

Short-Distance-Priority Main Frame Selection

Figure 12:
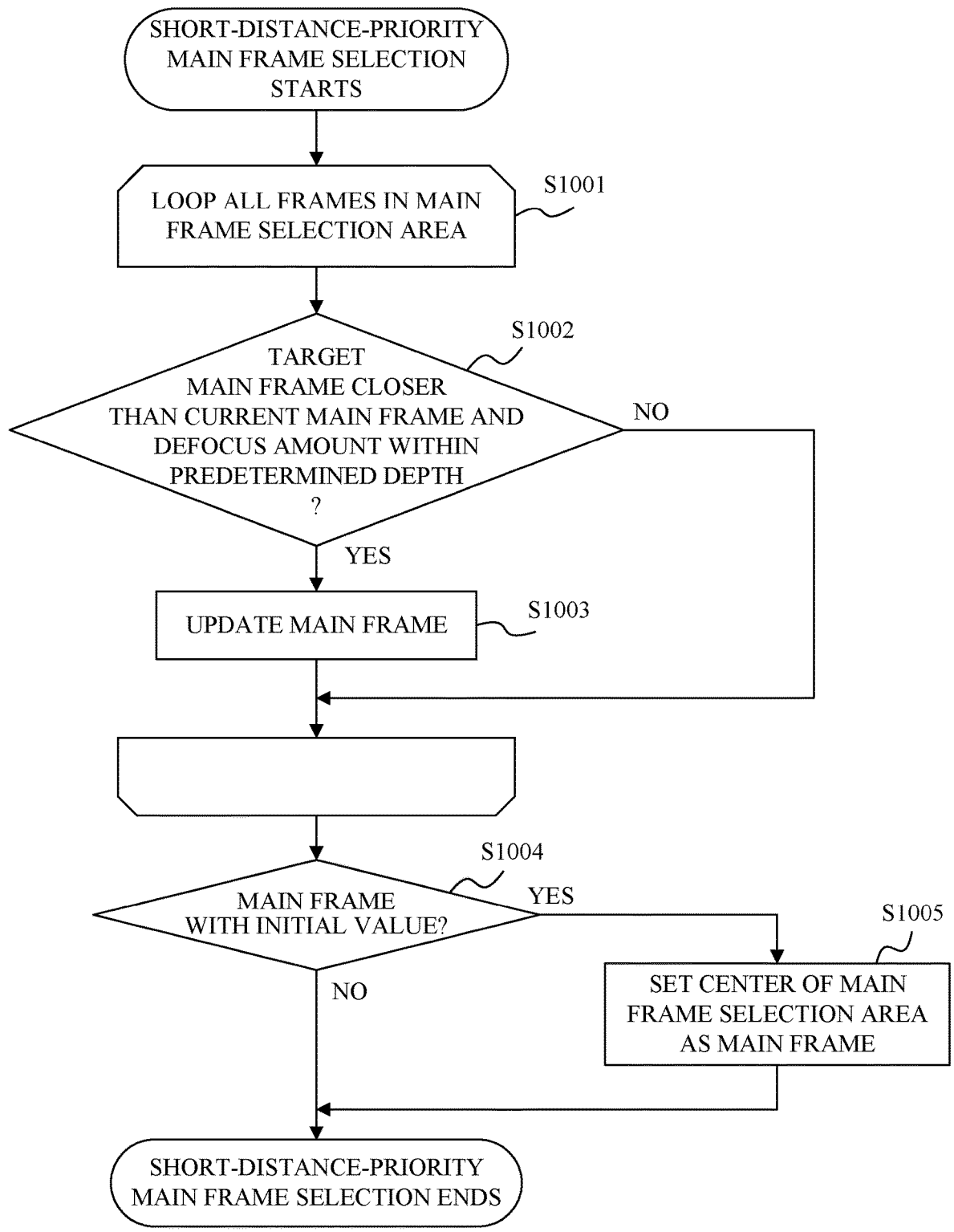
FIG. 12 is a flowchart of selecting a main frame by giving priority to a short distance (short-distance-priority main-frame selection) according to this embodiment.

Referring now to FIG. 12, a description will be given of step S902 (short-distance-priority main frame selection) in FIG. 11. FIG. 12 is a flowchart for the short-distance-priority main frame selection.

First, in step S1001, the system control unit 209 performs loop processing for all frames in order to select a main frame from the set main frame selection area. An initial value of a main frame may be previously set to information (such as the total number of frames+1) that can be used to determine that the main frame is not selected, and the illustration is omitted. Next, in step S1002, the system control unit 209 determines whether a target main frame is closer than a selected main frame (current main frame) and whether a defocus amount is within a predetermined depth. In a case where it is determined that the conditions of step S1002 are satisfied, the flow proceeds to step S1003, and the system control unit 209 updates the main frame. On the other hand, in a case where it is determined that the conditions in step S1002 are not satisfied, the system control unit 209 does not update the main frame.

Next, in step S1004, the system control unit 209 determines whether or not the main frame has been selected by the loop of step S1001 (whether or not the main frame has the initial value). In a case where it is determined that the main frame can be selected, the system control unit 209 ends the short-distance-priority main frame selection processing. On the other hand, in a case where it is determined that the main frame cannot be selected (the main frame has the initial value), the flow proceeds to step S1005. In step S1005, the system control unit 209 sets the main frame to the center of the main frame selection area, and terminates the short-distance-priority main frame selection processing.

Calculation of Lens Driving Amount

Figure 13:
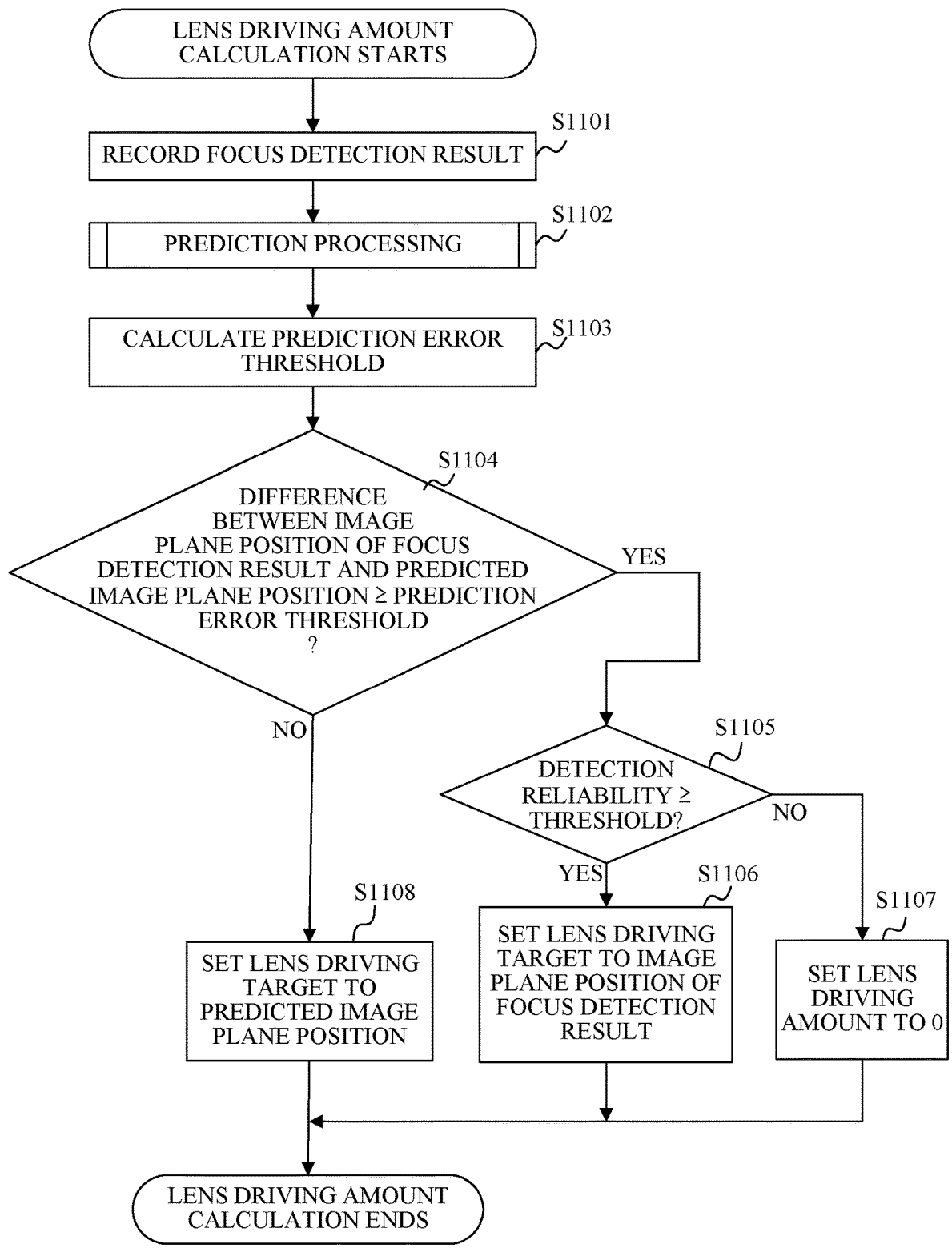
FIG. 13 is a flowchart of calculating a lens driving amount according to this embodiment.

Referring now to FIG. 13, a description will be given of step S403 (lens driving amount calculation) in FIG. 6. FIG. 13 is a flowchart of the lens driving amount calculation. First, in step S1101, the system control unit 209 stores a focus detection result (defocus amount and first image plane position of the object) in the main frame selected in step S402. The focus detection result is stored, for example, in an internal memory in the system control unit 209, but may be stored in a memory provided outside the system control unit 209. Since the focus detection result of the main frame is stored for each focus detection, the history of past focus detection results can be traced back.

Next, in step S1102, the system control unit 209 performs prediction processing using the object movement predictor 219 based on the history of the focus detection results (defocus amounts). That is, the system control unit 209 predicts a predicted image plane position (second image plane position) of the object at a predetermined time using the object movement predictor 219.

Figure 14:
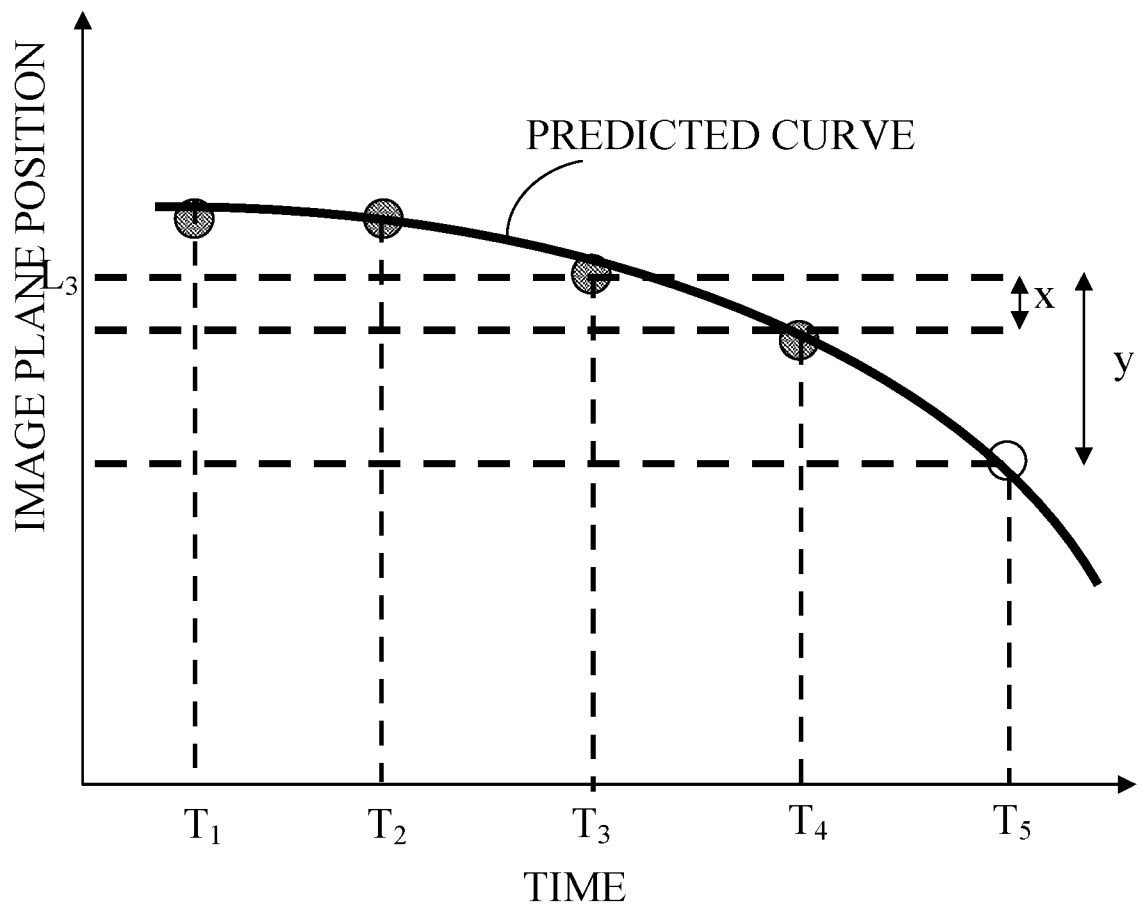
FIG. 14 explains prediction processing according to this embodiment.

FIG. 14 explains the prediction processing. In FIG. 14, a horizontal axis represents time, and a vertical axis represents an image plane position. The object movement predictor 219 draws a prediction curve such as that illustrated in FIG. 14 based on the history of the past focus detection results, thereby performing the prediction processing for calculating a predicted driving amount and a variation in the focus detection results. FIG. 14 illustrates that the larger the image plane position is, the longer the distance is. The history in FIG. 14 illustrates tracking an object approaching the photographer (camera).

As described above, the AF operation in step S203 of FIG. 2 is periodically performed in a servo imaging mode, and times T1 to T5 each represent times in a case where the AF operation is performed in step S203. The predicted image plane position can be obtained, for example, by calculating a prediction curve by the collective least squares method using the past image plane positions and respective focus detection times, and by calculating (predicting) the image plane position (second image plane position) at the prediction time (predetermined time) based on the prediction curve. The predicted time indicates the imaging time in a case where SW2 (218) is turned on, and the current focus detection time in a case where SW2 (218) is turned off. The prediction method is not limited to the collective least squares method. For example, the sequential least-squares method does not need to store a plurality of past focus detection histories. After the prediction processing ends, the flow proceeds to step S1103 in FIG. 13.

In step S1103, the system control unit 209 calculates and sets a prediction error threshold (first threshold). The prediction error threshold is calculated based on the detection reliability of the object detected by the object detector 211 in a permissible range as a shift amount between the image plane position of the focus detection result and the predicted image plane position calculated in step S1102 (defocus amount range in which the predicted image plane position is reliable). Here, the detection reliability represents a matching degree between the object detected by the object detector 211 at first time and the object detected by the object detector 211 at second time (time just before the first time), or a degree of likelihood that the object detected by the object detector 211 is a specific object. A prediction error threshold D can be expressed, for example, by the following equation (1):

$$D = \frac{C}{R} \tag{1}$$

where R is the detection reliability of the object and C is a constant relating to the prediction error threshold setting.

Here, the object detection reliability R is large in a case where the object detection result is more reliable, and is smaller in a case where the object detection result is less reliable. A minimum permissible value of the object detection reliability R is larger than zero.

Next, in step S1104, the system control unit 209 determines whether an absolute value of a difference between the first image plane position of the focus detection result and the predicted image plane position (second image plane position) calculated in step S1102 is equal to or higher than the prediction error threshold set in the step S1103. In a case where it is determined that the absolute value of the difference between the image plane position of the focus detection result and the predicted image plane position is lower than the prediction error threshold, the flow proceeds to step S1108. On the other hand, in a case where it is determined that the difference between the image plane position of the focus detection result and the predicted image plane position is equal to or higher than the prediction error threshold, the flow proceeds to step S1105.

In step S1108, the system control unit 209 sets a driving target of the focus lens 103 (lens driving target) to the predicted image plane position, sets the difference to the lens driving target as the lens driving amount, and ends the processing of calculating the lens driving amount. In step S1105, the system control unit 209 determines whether the detection reliability of the object detected by the object detector 211 is equal to or higher than the threshold (second threshold). In a case where it is determined that the detection reliability is equal to or higher than the threshold, the flow proceeds to step S1106. On the other hand, in a case where it is determined that the detection reliability is lower than the threshold, the flow proceeds to step S1107.

In step S1106, the system control unit 209 sets the driving target of the focus lens 103 to the image plane position of the focus detection result, sets the difference to the lens driving target as the lens driving amount, and ends the processing of calculating the lens driving amount. This embodiment performs driving based on a focus detection result in a case where there is a shift between the image plane position of the focus detection result and the image plane position of the prediction result (predicted image plane position) and the reliability of the object detection result (detection reliability) is sufficiently high. Thereby, even in a case where the movement of the object significantly changes or in a case where the past focus detection result has an error, tracking of the object can be continued without causing a large error in the focus driving target position. In step S1107, the system control unit 209 sets the driving amount of the focus lens 103, for example, to 0 (zero) without using the image plane position of the focus detection result, and ends the lens driving amount calculation processing.

Each embodiment can provide a focusing apparatus, an image pickup apparatus, a focusing method, and a storage medium, each of which can stably track an object.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-137432, filed on Aug. 31, 2022, which is hereby incorporated by reference herein in its entirety.

What is claimed is:

1. A focusing apparatus, comprising:
a memory storing instructions; and
a processor configured to execute the instructions to:
acquire, based on image data output from an image sensor, a first image plane position of an object and detection reliability,
predict a second image plane position of the object based on a history of a defocus amount acquired by a focus detecting unit, and
set a driving amount of a focus lens for focusing on the object based on the first image plane position in a case where the processor determines that a difference between the first image plane position and the second image plane position is larger than a first threshold,
wherein the processor sets the driving amount based on the first image plane position in a case where the processor determines that the detection reliability is higher than a second threshold.

2. The focusing apparatus according to claim 1, wherein the processor sets the driving amount based on the second image plane position in a case where the processor determines that the difference is smaller than the first threshold.

3. The focusing apparatus according to claim 1, wherein the processor sets the driving amount without using the first image plane position in a case where the processor determines that the detection reliability is lower than the second threshold.

4. The focusing apparatus according to claim 1, wherein the first threshold indicates a range of the defocus amount within which the second image plane position is reliable.

5. The focusing apparatus according to claim 1, wherein the first threshold varies according to the detection reliability.

6. The focusing apparatus according to claim 5, wherein the first threshold becomes lower as the detection reliability becomes higher.

7. The focusing apparatus according to claim 1, wherein the memory stores the history of the defocus amount.

8. The focusing apparatus according to claim 7, wherein the memory continues to store the defocus amount in a case where the processor sets the driving amount based on the first image plane position.

9. An image pickup apparatus comprising:
an image sensor; and
the focusing apparatus according to claim 1.

10. The image pickup apparatus according to claim 9, further comprising a driving unit configured to drive the focus lens based on the driving amount.

11. A focusing method comprising the steps of:
acquiring, based on image data output from an image sensor, a first image plane position of an object and detection reliability,
predicting a second image plane position of the object based on a history of a defocus amount acquired by a focus detecting unit, and
setting a driving amount of a focus lens for focusing on the object based on the first image plane position in a case where a difference between the first image plane position and the second image plane position is larger than a first threshold,
wherein the setting a driving amount is based on the first image plane position in a case when the detection reliability is higher than a second threshold.

12. A non-transitory computer-readable storage medium storing a program that causes a computer to execute the focusing method according to claim 11.

13. A focusing apparatus, comprising:
a memory storing instructions; and
a processor configured to execute the instructions to:
acquire, based on image data output from an image sensor, a first image plane position of an object and detection reliability,
predict a second image plane position of the object based on a history of a defocus amount acquired by a focus detecting unit, and
set a driving amount of a focus lens for focusing on the object based on the first image plane position in a case where the processor determines that a difference between the first image plane position and the second image plane position is larger than a first threshold,
wherein the detection reliability represents a matching degree between the object detected at a first time point and the object detected at a second time point.

14. The focusing apparatus according to claim 13, wherein the processor sets the driving amount based on the second image plane position in a case where the processor determines that the difference is smaller than the first threshold.

15. The focusing apparatus according to claim 13, wherein the processor sets the driving amount based on the first image plane position in a case where the processor determines that the detection reliability is higher than a second threshold.

16. The focusing apparatus according to claim 13, wherein the first threshold indicates a range of the defocus amount within which the second image plane position is reliable.

17. The focusing apparatus according to claim 13, wherein the first threshold varies according to the detection reliability.

18. The focusing apparatus according to claim 17, wherein the first threshold becomes lower as the detection reliability becomes higher.

19. The focusing apparatus according to claim 13, wherein the memory stores the history of the defocus amount.

20. The focusing apparatus according to claim 19, wherein the memory continues to store the defocus amount in a case where the processor sets the driving amount based on the first image plane position.

21. An image pickup apparatus comprising:
an image sensor; and
the focusing apparatus according to claim 13.

22. The image pickup apparatus according to claim 21, further comprising a driving unit configured to drive the focus lens based on the driving amount.

23. A focusing method comprising the steps of:
acquiring, based on image data output from an image sensor, a first image plane position of an object and detection reliability,
predicting a second image plane position of the object based on a history of a defocus amount acquired by a focus detecting unit, and
setting a driving amount of a focus lens for focusing on the object based on the first image plane position in a case where a difference between the first image plane position and the second image plane position is larger than a first threshold,
wherein the detection reliability represents a matching degree between the object detected at a first time point and the object detected at a second time point.

24. A focusing apparatus, comprising:
a memory storing instructions; and
a processor configured to execute the instructions to:
acquire, based on image data output from an image sensor, a first image plane position of an object and detection reliability,
predict a second image plane position of the object based on a history of a defocus amount acquired by a focus detecting unit, and
set a driving amount of a focus lens for focusing on the object based on the first image plane position in a case where the processor determines that a difference between the first image plane position and the second image plane position is larger than a first threshold,
wherein the detection reliability indicates a degree of likelihood that a detected object is a specific object.

25. The focusing apparatus according to claim 24, wherein the processor sets the driving amount based on the second image plane position in a case where the processor determines that the difference is smaller than the first threshold.

26. The focusing apparatus according to claim 25, wherein the processor sets the driving amount without using the first image plane position in a case where the processor determines that the detection reliability is lower than the second threshold.

27. The focusing apparatus according to claim 24, wherein the first threshold indicates a range of the defocus amount within which the second image plane position is reliable.

28. The focusing apparatus according to claim 24, wherein the first threshold varies according to the detection reliability.

29. The focusing apparatus according to claim 28, wherein the first threshold becomes lower as the detection reliability becomes higher.

30. The focusing apparatus according to claim 24, wherein the memory stores the history of the defocus amount.

31. The focusing apparatus according to claim 30, wherein the memory continues to store the defocus amount in a case where the processor sets the driving amount based on the first image plane position.

32. An image pickup apparatus comprising:
an image sensor; and
the focusing apparatus according to claim 24.

33. The image pickup apparatus according to claim 32, further comprising a driving unit configured to drive the focus lens based on the driving amount.

34. A focusing method comprising the steps of:
acquiring, based on image data output from an image sensor, a first image plane position of an object and detection reliability,
predicting a second image plane position of the object based on a history of a defocus amount acquired by a focus detecting unit, and
setting a driving amount of a focus lens for focusing on the object based on the first image plane position in a case where a difference between the first image plane position and the second image plane position is larger than a first threshold,
wherein the detection reliability indicates a degree of likelihood that a detected object is a specific object.

* * * * *